Aug. 28, 1928.
M. S. YOUNG ET AL
1,682,544
COMBINATION INFLOW CONTROLLING AND FLUID DISCHARGE MEANS
Filed Feb. 28, 1927 2 Sheets-Sheet 1
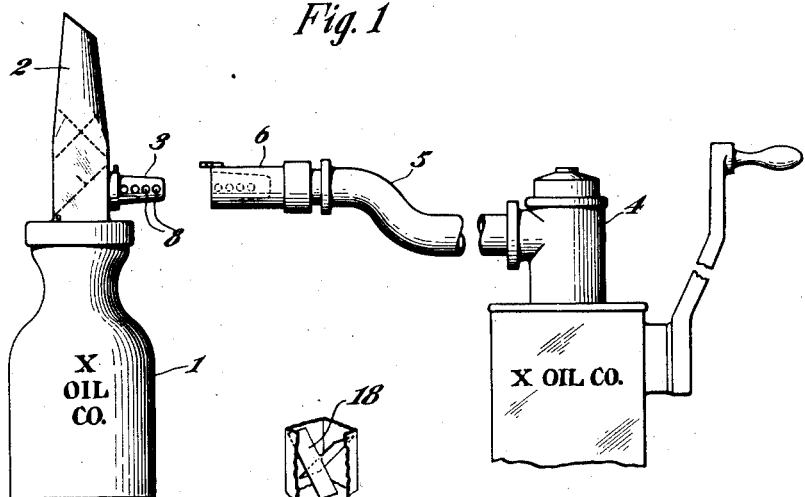
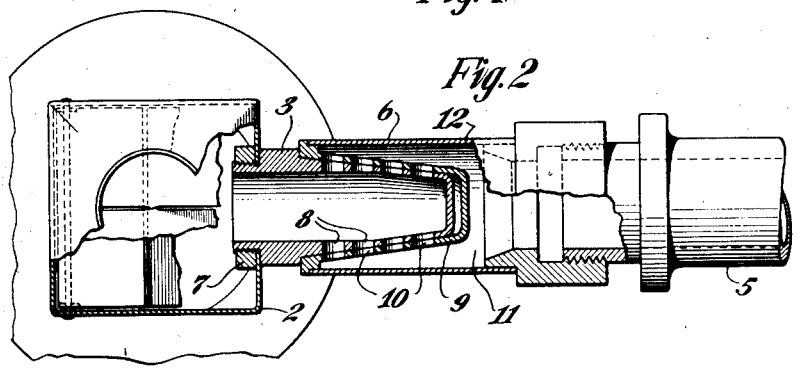
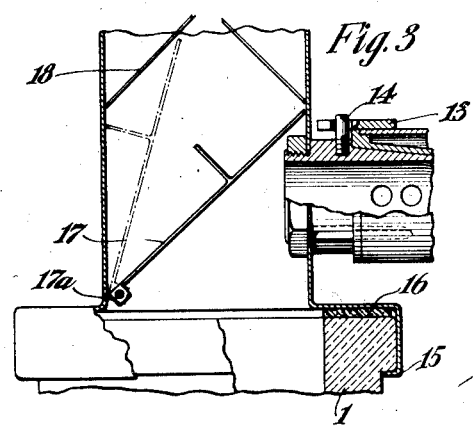
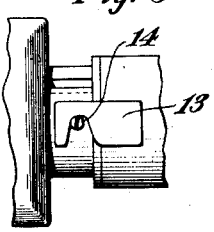
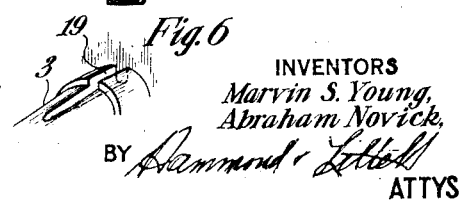
INVENTORS
Marvin S. Young,
Abraham Novick,
BY
ATTYS

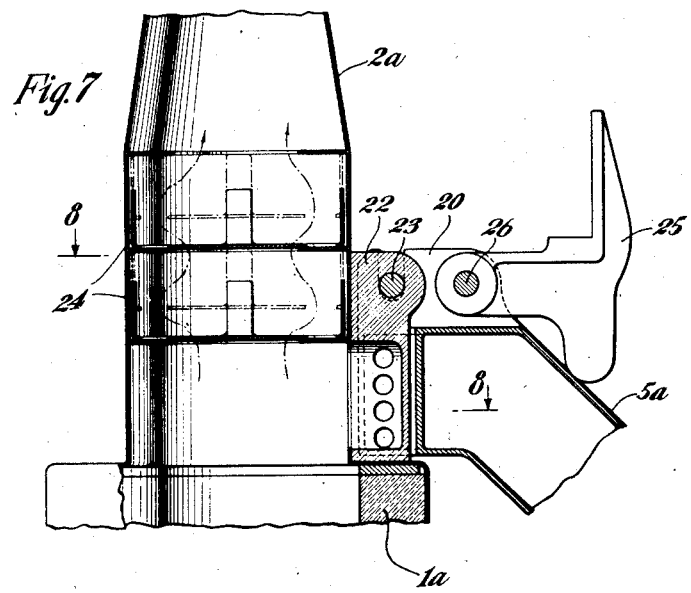
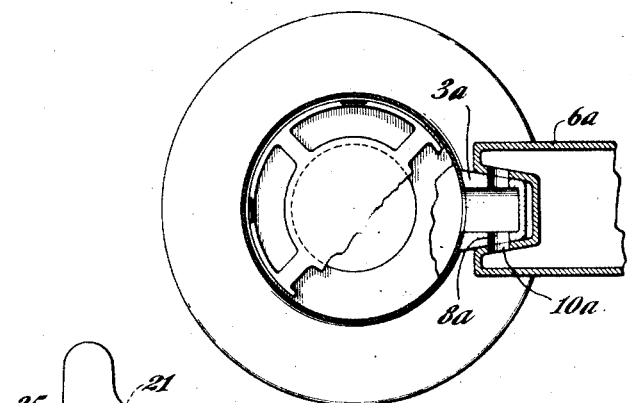
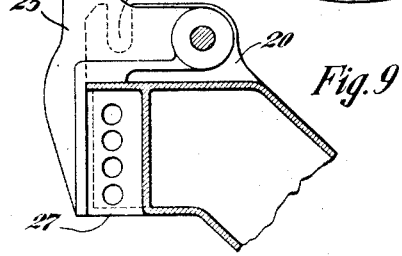

Patented Aug. 28, 1928.

1,682,544

UNITED STATES PATENT OFFICE.

MARVIN S. YOUNG, OF SCARSDALE, AND ABRAHAM NOVICK, OF FLUSHING, NEW YORK; SAID NOVICK ASSIGNOR TO SAID YOUNG.

COMBINATION INFLOW-CONTROLLING AND FLUID-DISCHARGE MEANS.

Application filed February 28, 1927. Serial No. 171,579.

This invention relates to means for filling receptacles and particularly to means for filling receptacles of a type in which small quantities of a liquid are to be placed such as a quart oil measure.

It is an object of this invention to provide a means whereby unauthorized filling of such a receptacle is avoided.

It is a further object of this invention to provide a novel funnel shaped nozzle on the filling source with a cooperating filling spout on the container whereby only one particular nozzle may be used to fill the container.

It is a further object of this invention to provide a filling spout for an authorized receptacle which will solely cooperate with a nozzle on a filling source to allow filling of the receptacle.

It is a further object of this invention to provide a container of the type described herein in which it is impractical to fill without the use of a certain cooperating filling nozzle attached to the filling source.

Another object of the invention is to provide a receptacle of the type described, which is ventilated to permit oil or other liquid to flow freely from but will not permit leakage of the liquid through the ventilating means.

Further features and objects of this invention will be more fully understood from the following detailed description of the drawings which illustrate two forms of embodiment of which my invention is susceptible, and in which Figure 1 is a diagrammatic side view of a dispensing pump and receiving bottle with my invention incorporated therein.

Figure 2 is a plan view of the bottle with the improved nozzle and filler spout partially cut away.

Figure 3 is a vertical section through the filler spout showing the arrangement of the lower baffles and other parts.

Figure 4 is a partially cut away perspective showing the arrangement of the upper baffles.

Figure 5 is a plan view of the improved connection showing the retaining means.

Figure 6 is a perspective of the bottom of the filler spout showing the cut away portion.

Figure 7 is a vertical section through a modified form of receiving bottle and nozzle.

Figure 8 is a horizontal section on the line 8—8 of Figure 7.

Figure 9 is a detail of the nozzle with the pouring lip in operative position.

In the dispensing art and especially that dealing with gasoline and lubricants, it has frequently been the practice of unscrupulous agents to fill a container branded by a certain particular company, with a different and usually inferior quality of material. A particular producing company will, with great effort and expense, produce a certain product and which by its own merits and by its advertising, will become well known to the user public, who will ofttimes drive out of their way to procure the product of that company. But due to the fact that a cheaper or different product is more easily obtainable and usually more profitable to sell due to its inferiority, the dealer or dispensing agent will foist this other product on his customers, who, not knowing the details of filling of the agents' reservoirs, with something that may be just as good, but in reality is different, are unfortunately the victims of the fraud.

Besides the consumer who does not get what he pays for, the concern producing the grade and quality of material that has been asked for by the unsuspecting public, in having its containers filled with a substitute product and offered as its own of the grade and quality advertised is also subject to fraud because it loses the profits from the sale of its own gasoline or lubricant and it also loses that most important asset, "good will", because the inferior product is unsatisfactory to the man who wants and pays for a definite article but is unfortunately frequently deceived.

This most flagrant substitution of materials by dishonest vendors for the slight pecuniary profit has occurred in the dispensing of reclaimed lubricating oils which are easily treated to look like new and yet whose relative cost between the new and a doctored substitute is great. It is well known that this doctored oil is of a very inferior quality and is exceedingly harmful to the engine or other moving parts with which it comes in contact.

However, the means of sealing containers of this class has been practically unsuccessful as it was left to the agent to lock the container and keep it locked. This voluntary act of the dealer is done away with in our invention which comprises means to seal and keep sealed a portable unit measure and which may only be filled by the use of the cooperating equipment which is used and authorized by the producing company, as will more fully appear in the following description of forms of embodiment of our invention:

Figure 1 shows a common variety of fluid measure and which is frequently a one quart bottle 1 with a metallic top in the shape of a discharge snout 2; the bottle 1 being filled solely through a filling spout 3 from some source such as an oil pump 4 conveyed by an intermediate pipe 5 tipped with a nozzle 6 which cooperates with the filling spout 3 on the bottle top 2.

As best shown in Figure 2, the spout 3 is the shape of a frustrum of a cone and is fastened permanently to the inside of the top 2 by a screw threaded collar 7 on the reduced inner end portion and has a series of apertures 8 in the faces of the outwardly projecting surface portions.

The nozzle 6 is likewise provided with cone shaped sides 9 apertured at 10 to correspond and cooperate with the apertures 8 in the spout 3. The portion 11 of the nozzle between the inwardly projected cone sides 10 and the tubular sleeve 12 is open to afford a channel directly to the oil source. On the periphery of the cylindrical portion 12 is a means for temporarily retaining the filling spout and receiver while being filled from the nozzle 6. It is here shown as a lug 13 notched to engage with an upwardly projecting pin 14 screwed into the filling spout 3. A partial turn is sufficient to bring the lug in contact and to aline the series of holes 8 and 10 to allow filling of the receptacle or bottle 1.

The receptacle top 2 is fastened to the receptacle 1 by bending over and crimping the edges 15 under the shoulder on the receptacle as shown in Figure 3. In assembly, a cork or other cushion gasket 16 is placed between the top of the bottle and the bottom of the snout 2 to insure a tight joint without injuring the bottle. The top 2 has two baffles 17 and 18, the baffle 17 being hinged at 17$^a$ to open when the material is to be poured out of the bottle. The baffle 18 as best shown in Figure 4 consists of two crossed plates practically hindering any and all attempts to open the baffle 17 to effectively prevent filling of the receptacle through the top of the receptacle cover 2.

As has been pointed out, the pump 4 with the particular nozzle 6 is a part of the equipment of an authorized oil service station and in which, by various other means shown in my other copending applications, the oil is known and can be guaranteed to be of a definite quality. With this pump is supplied a number of bottles or other measuring receivers having filling spouts that correspond to the nozzle of the pump for which supplied.

Inasmuch as the oil or fluid to be put in these bottles can not be successfully forced through the pouring snout, it is necessary that the oil be pumped through the filling spout 3 through the cooperating nozzle 6.

As shown in Figure 6, the cut away portion 19 which extends from the most extended end of the filling spout 3 is of such capacity that the practical difficulties of filling this receptacle 1 with fluid through a hose or any other means surrounding the spout 3 is doomed to failure inasmuch as the bottom of the spout will allow a drain from the filling source. Furthermore, as this channel is open to inspection, any tampering or filling by unscrupulous persons will be noticed immediately.

In the modified form shown in Figures 7, 8 and 9, the receptacle or bottom top 2$^a$ is similar in shape to that shown at 2 in Figure 1, and is similarly provided with a filling spout 3$^a$ which however is of a different shape, more difficult to fill and easier to construct. This form is of frustro-pyramidal shape the vertical planar sides of which are provided with a series of apertures 8$^a$ through which the fluid enters. Integral with the end of the conveying pipe 5$^a$ which is purposely inclined to allow drainage to the filling source, is the cooperating embracing flange nozzle 6$^a$ which has alined apertures 10$^a$ to coact with the holes 8$^a$ and convey the oil or other fluid from the conveying pipe to the interior of the bottle or other measuring receptacle.

The nozzle end 6$^a$ has a surmounting boss 20 in which is a vertical slot 21 as shown in Figure 9, and the bottle top 2$^a$ has a boss 22 above the pyramidal filling spout and through which projects a horizontal pin 23, adapted to enter the slot 21 in the nozzle end.

The baffles 24 are of a disc shape, substantially the interior size of the discharge snout 2$^a$ with upstanding lugs which keep the disc in correct position and allow sufficient movement without undue friction on the sides, are inserted in superposed relation over web like retainers, whose solid portions are in alinement with the open portions of the baffle. It will be seen by inspection of Figures 7 and 8 that when the discs 24 settle by gravity to the position shown, no fluid will find an inward path to the bottom of the receptacle 1$^a$. But when the bottle 1$^a$ is inverted for the purpose of pouring, the baffles 24 reach the dotted line positions as shown in Figure 7 and there is a continuous opening for the discharge of the fluid as shown by the sinuous dotted lines.

If it is desired to use the nozzle 6$^a$ without filling the receptacle 1$^a$, for example when it is desired to draw a small quantity of oil into an open receiver, to prevent spurting of the liquid, lip baffle 25 hinged at 26 to the boss on the end of the nozzle 6$^a$ may be turned down from the open position in Figure 7 to the closed position in Figure 9. This will then cause the liquid to flow directly down out of the open end 27 of the nozzle.

In the operation of this form of the device, it will be noted that it is impossible to adapt any other nozzle or filling means to this filling spout on the receptacle top and that for operative purposes, it is merely necessary to use particular bottle tops with the corresponding nozzles, that there is no change necessary in the construction of the pump or in the receiver and that a practical safeguard is afforded.

In the use of this invention, it is contemplated that the dispensing source or pump 4 will be provided with the name or mark of the producing company so that a definite article may be placed therein and by means of some form of control means such as described in one of my copending applications, the fluid may be guaranteed. Therefore, with the portable unit measures 1, also marked with the name of the company, and provided with the means of sealing as described herein, the ultimate consumer may be sure that the article that is poured into his automobile engine for example is the article that he desires and that he pays for.

It will further be noted that in pouring the fluid from the portable receptacle 1, the intake spout 3 is open to the atmosphere and as the plurality of small openings in the filling spouts provide a greater area than is practicable with the use of one large opening and permit more rapid emptying of the containers than is now possible. Another very important advantage of the plurality of small openings 8 or 8ª in the filling spouts is that they permit better ventilation of the bottle when pouring a liquid therefrom, by actual test our containers discharge about twenty five percent quicker than the best ventilated oil receptacles now in use, as the air can enter the small openings 8 in larger volume without permitting any oil to leak from the openings 8 preventing the formation of a vacuum in the receptacle, whereas if only one large opening of the total area of the holes 8 were provided the inrush of the air would not be great enough to keep back the oil from this large opening and leakage around the filling spout would occur.

Whereas we have described our invention by reference to specific forms thereof, it will be understood that many changes and modifications may be made without departing from the spirit of the invention and we do not therefore desire to limit ourselves to the specific embodiments shown but to interpret the invention broadly within the scope of the appended claims.

We claim:

1. As a new article of manufacture, a bottle top for dispensing receptacles, said top being provided with a filling spout of irregular contour apertured to admit fluid therein, and a pouring snout provided with a valve to permit outward flow only and a series of baffles preventing access to the valve.

2. In a pouring spout for oil bottles, valve means within the spout to prevent filling the bottle through the spout outlet and an inlet means carried by said spout to permit filling from a cooperating filling member.

3. In a pouring spout for oil bottles, means within the spout to prevent filling by pouring into said spout and an inlet means carried by the spout to permit filling from a cooperating filling member.

4. In a pouring spout for oil bottles, a pouring outlet, and a filling inlet carried by the spout, valve means in the outlet to prevent filling through the outlet and means on the inlet to cooperate with a special filling nozzle for filling and to make difficult the filling of the bottles from other than said special filling nozzle.

5. In an oil dispensing receptacle a pouring spout, a check valve carried within the spout to prevent refilling the receptacle through the discharge end of the spout and a filling nozzle carried by said spout below said check valve.

6. In a pouring spout for oil bottles, a check valve carried within the spout to prevent refilling the bottle through the discharge end of the spout, means to prevent access to the check valve for opening the same, and a filling nozzle carried by the spout and opening below said check valve to permit refilling.

7. In a pouring spout for oil bottles, a check valve carried within the spout to normally prevent refilling the bottle through the discharge end of the spout, means to normally prevent opening of said check valve for refilling, and a filling means carried by said spout whereby oil may be introduced into said bottle.

8. In a pouring spout for oil bottles, a check valve carried within the spout to normally prevent refilling the bottle through the discharge end of the spout, means to normally prevent opening of said check valve for refilling, means to secure the pouring spout permanently to an oil bottle, and a filling means carried by said spout whereby oil may be introduced into said bottle.

9. As a new article of manufacture, a top for dispensing receptacles, said top being provided with a filling spout of irregular contour having a plurality of filling openings therein to admit fluid therein, and a pouring spout provided with a valve to permit outward flow only and a series of baffles preventing access to the valve.

In testimony whereof we have affixed our signatures to this specification.

MARVIN S. YOUNG.
ABRAHAM NOVICK.